US 6,998,545 B2

(12) United States Patent
Harkcom et al.

(10) Patent No.: US 6,998,545 B2
(45) Date of Patent: Feb. 14, 2006

(54) TOUCH AND PROXIMITY SENSOR CONTROL SYSTEMS AND METHODS WITH IMPROVED SIGNAL AND NOISE DIFFERENTIATION

(75) Inventors: Alton Harkcom, Peachtree City, GA (US); David A. Dettweiler, Newnan, GA (US)

(73) Assignee: E.G.O. North America, Inc., Newnan, GA (US)

( * ) Notice: Subject to any disclaimer, the term of this patent is extended or adjusted under 35 U.S.C. 154(b) by 399 days.

(21) Appl. No.: 10/620,841

(22) Filed: Jul. 16, 2003

(65) Prior Publication Data

US 2004/0056845 A1    Mar. 25, 2004

Related U.S. Application Data

(60) Provisional application No. 60/397,210, filed on Jul. 19, 2002.

(51) Int. Cl.
*G08C 21/00*     (2006.01)
(52) U.S. Cl. .................... 178/18.02; 345/178; 345/173
(58) Field of Classification Search ................ 345/175, 345/176, 178, 177
See application file for complete search history.

(56) References Cited

U.S. PATENT DOCUMENTS

| 5,796,183 | A | 8/1998 | Hourmand |
| 6,380,931 | B1 * | 4/2002 | Gillespie et al. ............. 345/173 |
| 2004/0196269 | A1 * | 10/2004 | Dotson ....................... 345/173 |

* cited by examiner

*Primary Examiner*—Kent Chang
*Assistant Examiner*—Donna Lui
(74) *Attorney, Agent, or Firm*—Alston & Bird LLP (57) ABSTRACT

The present invention discloses a novel new technique for detecting an intended activation of a touch sensor in the presence of noise. An algorithm is described that compares a cumulative deviation of a touch sensor reading to a scale to obtain a ratio expressed as a percentage. The percentage is compared against a target threshold and the period required to reach the threshold is examined to determine whether the rise or fall in touch sensor readings is attributable to a touch or to system noise. Additional disclosed embodiments describe circuits configured to operate in a noisy environment and have touch sensors arranged as arrays that are capable of detecting a direction and speed of a human-like contact.

36 Claims, 7 Drawing Sheets

TOUCH AND PROXIMITY SENSOR CONTROL SYSTEMS AND METHODS WITH IMPROVED SIGNAL AND NOISE DIFFERENTIATION

CROSS-REFERENCE TO RELATED APPLICATIONS

The present application claims priority from U.S. Provisional Patent Application Ser. No. 60/397,210, entitled "TOUCH AND PROXIMITY SENSOR CONTROL SYSTEMS AND METHODS WITH IMPROVED SIGNAL AND NOISE DIFFERENTIATION," filed on Jul. 19, 2002, the contents of which are herein incorporated by reference.

FIELD OF THE INVENTION

The present invention relates to electronic control devices, which use sensors, such as capacitive or inductive sensors, to detect human or human-like contact or proximity. Embodiments of the present invention are described in the context of an appliance or device that uses touch sensors operating through a dielectric substrate, and in the context of electro-mechanical devices for contiguous input including but not limited to potentiometers and encoders.

BACKGROUND OF THE INVENTION

A wide variety of sensors are known in the art and are used to detect human or human-like contact with or proximity to the sensors. These sensors typically provide a voltage level that is passed to other circuitry either directly or through a conditioning circuit. This voltage level functions as a trigger or a threshold and is used to determine whether a human or human-like object has requested an operation, or whether a human or human-like object is present. Sensors of this type are often found in electronic devices such as kitchen appliances and are designed to operate through a dielectric substrate in order to provide an easy-to-clean surface such as a glass-ceramic cook top or a flat control panel.

One problem with conventional sensors and control circuits is that they are prone to noise disruption. Contamination is one simple source of noise that can impact a sensor and control system. For example, the glass-ceramic that functions as the dielectric substrate in a cook-top appliance can become contaminated when a substance such as ketchup is spilled over a sensor area. Or a false trigger might be generated by the simultaneous touch of multiple sensors when a damp cloth is used to clean an appliance. In U.S. Pat. Nos. 5,594,22 and 6,310,611 the problem of noise caused by contamination is discussed, and a system is disclosed in which touch sensors are attached to one side of a substrate for detecting user contact on the opposite side of the substrate, thereby separating the touch sensors from the contaminant.

Some sources of noise, however, are not so easily remedied. Conventional sensors and their controls are prone to radio interference from nearby devices such as radio towers, cell phones and other portable radio devices. This type of noise typically appears as spikes on a sensor or on multiple sensors, but can appear as a slower attenuation. In addition, sensors and their controls are prone to electromagnetic noise in the circuitry of the device through such things as cross talk between sensor channels and attenuation of the signals due to noise generated from power supplies or conditioning circuitry. This type of noise can also appear as spikes or slower attenuation and typically affects all sensors in a similar manner.

In an effort to differentiate between a false signal caused by noise and a legitimate request for operation, most sensor controls use well-known techniques for signal filtering in the circuit, as well as standard signal processing. A program in a microcontroller, a specially designed integrated circuit chip or a signal processing circuit typically performs the signal processing function. The signal processing techniques that are known in the art include average readings of the sensor, requiring multiple attenuations to the sensor value across successive readings (possibly in a specified time period), imposing a delay to allow for checking for multiple sensors indicating an event, and masking most or all simultaneous events. Another known technique for handling noise is via signal coupling through a connection to earth ground or the appliance with confirmation of the coupled signal. But while these sensor-signal processing techniques help to reduce the disruptions caused by noise, they often create new problems. For example, these standard techniques reduce responsiveness of the control to input and prohibit operation in the presence of noise. In addition, these techniques strictly limit the use of special functions that require simultaneous key presses for more complex operation of the device.

A unsatisfied need therefore exists in the industry for an improved touch and proximity sensor control system and method that addresses the shortcomings of the conventional systems, some of which have been described above.

SUMMARY OF THE INVENTION

The present invention discloses a novel new technique for detecting an intended activation of a touch sensor in the presence of noise. An algorithm is described that compares a cumulative deviation of a touch sensor reading to a scale to obtain a ratio expressed as a percentage. The percentage is compared against a target threshold and the period required to reach the threshold is examined to determine whether the rise or fall in touch sensor readings is attributable to a touch or to system noise. Additional disclosed embodiments describe circuits configured to operate in a noisy environment and have touch sensors arranged as arrays that are capable of detecting a direction and speed of a human-like contact.

In one embodiment, a method of differentiating between an intended activation of a touch sensor and noise in a circuit is describes that includes the steps of receiving a touch sensor reading; calculating an amount of deviation between the touch sensor reading and an average sensor reading; adding the amount of deviation to a cumulative deviation tally; obtaining a ratio of the cumulative deviation tally to a scale; incrementing a counter that tracks the number of touch sensor readings included in the cumulative deviation tally; and sending an output signal indicative of a touch if the ratio meets or exceeds a threshold and the counter falls within a predetermined range.

In another embodiment, a method of differentiating between an intended activation of a touch sensor and noise in a circuit is describes that includes the steps of receiving a touch sensor reading; calculating an amount of deviation between the touch sensor reading and a running average sensor reading, the running average sensor reading comprising an average of the most recent four sensor readings; adding the amount of deviation to a cumulative deviation tally; obtaining a ratio of the cumulative deviation tally to a scale; incrementing a counter that tracks the number of touch sensor readings included in the cumulative deviation tally; and sending an output signal indicative of a touch if the ratio meets or exceeds a threshold and the counter falls within a predetermined range.

In another embodiment, a method of differentiating between an intended activation of a touch sensor and noise in a circuit is describes that includes the steps of receiving a touch sensor reading; calculating an amount of deviation between the touch sensor reading and an average sensor reading; adding the amount of deviation to a cumulative deviation tally; obtaining a ratio of the cumulative deviation tally to a scale; comparing the ratio against at least one stored ratio to determine whether the ratio is continuing a trend of increasing or decreasing; resetting the cumulative deviation tally if the most recent ratio is not continuing the trend established by said at least one stored ratio; incrementing a counter that tracks the number of touch sensor readings included in the cumulative deviation tally; and sending an output signal indicative of a touch if the ratio meets or exceeds a threshold and the counter falls within a predetermined range.

In a preferred embodiment, a method of differentiating between an intended activation of a touch sensor and noise in a circuit is describes that includes the steps of receiving a touch sensor reading; calculating an amount of deviation between the touch sensor reading and an average sensor reading; adding the amount of deviation to a cumulative deviation tally; obtaining a ratio of the cumulative deviation tally to a scale; incrementing a counter that tracks the number of touch sensor readings included in the cumulative deviation tally; and sending an output signal indicative of a touch if the ratio meets or exceeds a threshold over a period of between two and eight touch sensor readings.

In another embodiment, a method of differentiating between an intended activation of a touch sensor and noise in a circuit is disclosed that includes the steps of receiving a touch sensor reading; calculating an amount of deviation between the touch sensor reading and an average sensor reading; adding the amount of deviation to a cumulative deviation tally; obtaining a ratio of the cumulative deviation tally to a scale; comparing the ratio against a stored ratio to determine whether the ratio is increasing; performing the following steps if the ratio is increasing 1) incrementing a counter that tracks the number of touch sensor readings included in the cumulative deviation tally; and 2) sending an output signal indicative of a pressed touch sensor if the ratio meets or exceeds a threshold and the counter falls within a predetermined range; and performing the following steps if the ratio is not increasing 1) incrementing a counter that tracks the number of touch sensor readings included in the cumulative deviation tally; and 2) sending an output signal indicative of a released touch sensor if the ratio meets or exceeds a threshold and the counter falls within a predetermined range.

In still another embodiment, a method of analyzing readings from a touch sensor to differentiate between noise and a presence of a human-intended activation of the touch sensor is disclosed that includes the steps of receiving a first group of sensor readings; calculating an average reading of the first group; receiving a second group of sensor readings; calculating a deviation from the average reading for each sensor reading in the second group; calculating a cumulative deviation for the second group; obtaining a ratio of the cumulative deviation to a maximum value; and indicating that the human-intended activation has occurred if the ratio meets or exceeds a threshold value; and the threshold value is met or exceeded within a predetermined number of sensor readings.

In another related embodiment, a method of analyzing readings from a touch sensor to differentiate between noise and a presence of a human-intended activation of the touch sensor is disclosed that includes the steps of receiving a first group of sensor readings; calculating an average reading of the first group; receiving a second group of sensor readings; calculating a deviation from the average reading for each sensor reading in the second group; calculating a cumulative deviation for the second group; obtaining a ratio of the cumulative deviation to a maximum value; and indicating that the human-intended activation has occurred if the ratio meets or exceeds a threshold value; and the threshold value is met or exceeded within a predetermined number of sensor readings. In this embodiment, the maximum value is established as the highest potential sensor reading (in volts) and the sensor readings are received at a frequency of approximately one every sixteen milliseconds.

In another embodiment, a method of differentiating between an intended activation of a touch sensor and noise in a circuit is disclosed that includes the steps of receiving a signal that includes a plurality of touch sensor readings that are multiplexed into the signal; demultiplexing the signal to isolate a single touch sensor reading; calculating an amount of deviation between the single touch sensor reading and an average sensor reading; adding the amount of deviation to a cumulative deviation tally; obtaining a ratio of the cumulative deviation tally to a scale; incrementing a counter that tracks the number of touch sensor readings included in the cumulative deviation tally; and sending an output signal indicative of a touch if the ratio meets or exceeds a threshold and the counter falls within a predetermined range. In a separate, but related embodiment, each of the multiplexed touch sensor readings that are received in the signal is associated with a unique time interval and voltage.

Still another disclosed embodiment of the present invention is a capacitive responsive circuit for detecting a proximity or touch of a person in a noisy environment and for controlling power to a load. In a disclosed embodiment, the circuit includes an oscillator that provides a periodic output signal; a touch circuit coupled to the oscillator to receive the periodic output signal, the touch circuit including a touch sensor for receiving tactile command information from an operator, the touch circuit further comprising a low pass filter for converting a frequency of the periodic output signal to a DC voltage value; and a detector circuit coupled to the touch circuit, the detector circuit including a microcontroller that receives a plurality of the DC voltage values over time and generates an output signal in response to an intended activation of the touch sensor, the microcontroller configured to monitor the plurality of DC voltage values and to detect an intended activation of the touch sensor based at least in part on a comparison of a ratio of a cumulative deviation of the plurality of DC voltage values from an average voltage value to a scale against a threshold ratio.

Another embodiment, a capacitive responsive circuit for detecting a proximity or touch of a person in a noisy environment and for controlling power to a load is disclosed that includes an oscillator that provides a periodic output signal; a touch circuit coupled to the oscillator to receive the periodic output signal, the touch circuit including a plurality of touch sensors that receive tactile command information from an operator, the touch circuit further including a low pass filter associated with each of the plurality of touch sensors for converting a frequency of the periodic output signal to a DC voltage value; and a detector circuit coupled to the touch circuit, the detector circuit including a microcontroller that receives a plurality of the DC voltage values over time and generates an output signal in response to an intended activation of the touch sensor, the microcontroller configured to monitor the plurality of DC voltage values and to detect an intended activation of the touch sensor based at least in part on a comparison of a ratio of a cumulative deviation of the plurality of DC voltage values from an average voltage value to a scale against a threshold ratio.

In yet another embodiment, a capacitive responsive circuit for detecting a proximity or touch of a person in a noisy environment and for controlling power to a load is disclosed that includes an oscillator that provides a periodic output signal; a touch circuit coupled to the oscillator to receive the periodic output signal, the touch circuit including a plurality of touch sensors arranged in an array and configured to detect a direction and speed of a human-like contact, the plurality of touch sensors configured to receive tactile command information from an operator, the touch circuit further including a low pass filter associated with each of the plurality of touch sensors for converting a frequency of the periodic output signal to a DC voltage value; and a detector circuit coupled to the touch circuit, the detector circuit including a microcontroller that receives a plurality of the DC voltage values over time and generates an output signal in response to an intended activation of the touch sensor, the microcontroller configured to monitor the plurality of DC voltage values and to detect an intended activation of the touch sensor based at least in part on a comparison of a ratio of a cumulative deviation of the plurality of DC voltage values from an average voltage value to a scale against a threshold ratio.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention improves on touch and proximity sensor control systems that are known in the art by enhancing the ability to differentiate between an intended human activation and noise. In addition, the present invention introduces a novel method of system input that uses sets and/or arrays of sensors to perform inputs that historically required the use of potentiometers or encoders. As a result, linear, curvi-linear, circular and/or abstract activation can be used with the present invention.

Figure 1:
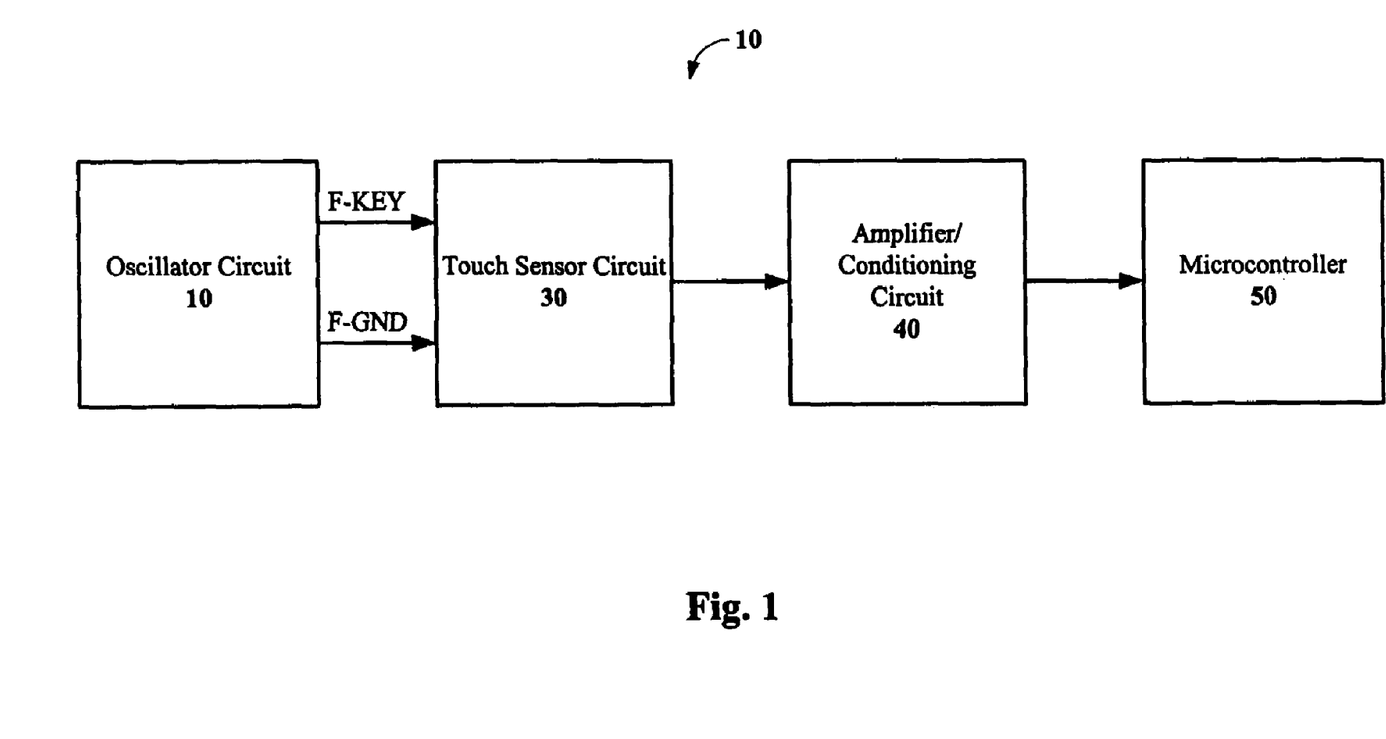
FIG. 1 is a high-level block diagram of a touch capacitance control circuit in accordance with an embodiment of the present invention.

FIG. 1 is a high-level block diagram that illustrates the various parts of a touch capacitance control circuit 10 in accordance with an embodiment of the present invention. In this embodiment, the control circuit 10 includes an oscillator 20, a touch-sensor circuit 30, a conditioning circuit 40 and a microcontroller 50. The operation and function of touch capacitance circuits are generally well known in the art and are the subject of other patents, including U.S. Pat. No. 5,973,417 to Goetz et al. These circuits, however, do not have an enhanced ability to detect a touch in the presence of noise like that which exists in a preferred embodiment of the present invention.

Figure 2:
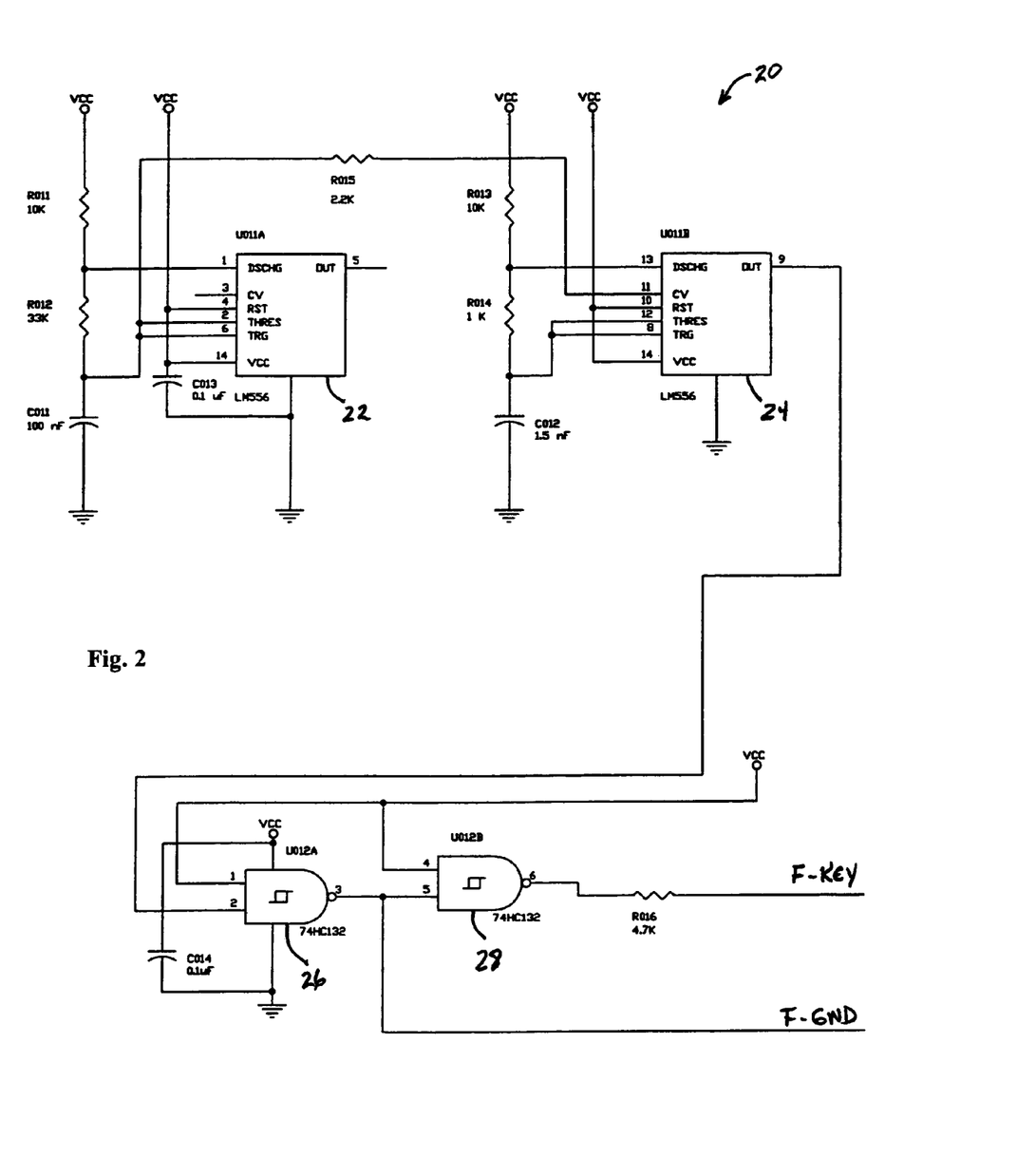
FIG. 2 is a diagram of an oscillator circuit in accordance with an embodiment of the present invention.

FIG. 2 shows an oscillator 20 of a touch capacitance control circuit 10 in accordance with an embodiment of the present invention. In this embodiment, the oscillator circuit 20 comprises first 22 and second 24 oscillators that are coupled to a pair of inverters (26 and 28) in a conventional manner. This oscillator circuit 20 produces a signal that sweeps the frequency range between 50 and 100 KHz. Two signals are output from the oscillator circuit 20 to the touch-sensor circuit 30 and are identified in the figure as F-KEY and F-GND. The F-KEY signal is output from the second inverter 28 and therefore is in phase with the signal output from the oscillators. In contrast, the F-GND signal is output from the first inverter 26 and is 180° out of phase with the signal output from the oscillators and with the F-KEY signal.

Figure 3:
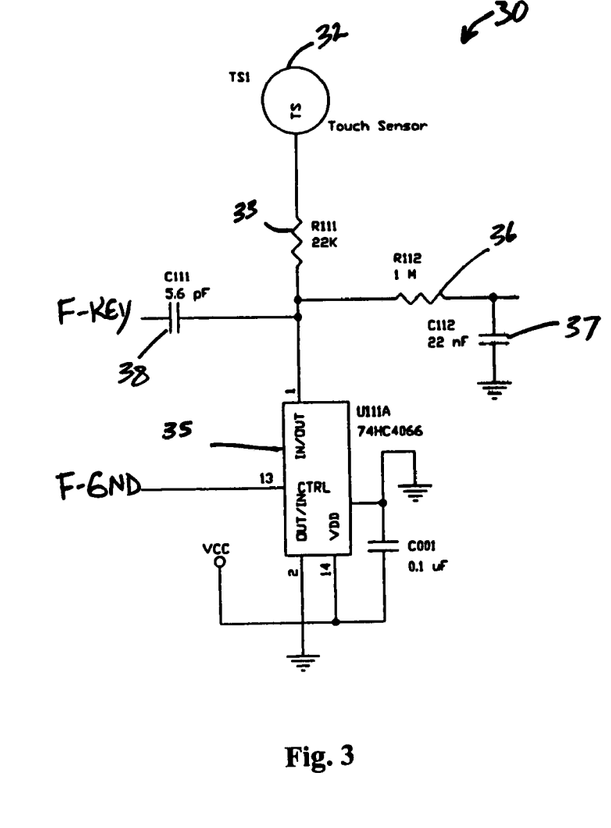
FIG. 3 is a diagram of a capacitive touch sensor circuit in accordance with an embodiment of the present invention.

FIG. 3 shows an embodiment of a touch-sensor circuit 30 that receives the F-KEY and F-GND signals output from the oscillator circuit 20. The touch-sensor circuit 30 illustrated in FIG. 3 is conventional in design and includes a touch sensor 32 coupled via a resistor 33 to a switch circuit 35 and a low pass filter that comprises resistor 36 and capacitor 37. The F-KEY signal from the oscillator circuit 20 charges capacitor 38 on the high cycle of the oscillator signal. When the signal from the oscillator signal goes low, the F-GND signal, which is 180° out of phase from the oscillator signal, goes high and causes the switch circuit to discharge capacitor 38.

In this embodiment, the low-pass filter functions as a frequency to voltage converter and converts the frequency of the signal at the junction of capacitor 38 and resistor 33 into a DC voltage value. The DC voltage is then output from the touch 20 sensor circuit 30 to the conditioning or amplifier circuit 40. When a person touches or comes into proximity with the touch sensor 32, the person's body capacitance is coupled in series with resistor 33 and results in a drop in voltage at the junction of capacitor 38 and resistor 33 and a corresponding drop in the DC voltage value output to the conditioning circuit 40.

Figure 4:
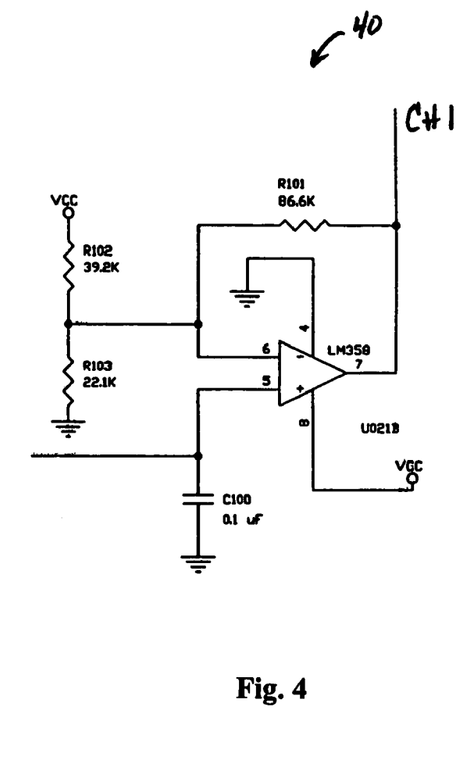
FIG. 4 is a diagram of a conditioning circuit in accordance with an embodiment of the present invention.

FIG. 4 shows a conditioning circuit 40 in accordance with an embodiment of the present invention. The conditioning circuit 40 is conventional in design and is configured to receive the DC voltage value from the low pass filter of the touch sensor circuit 30. The conditioning circuit 40 amplifies the DC voltage value received from the low pass filter and passes the amplified DC voltage (shown in the figure as CH1) to the microcontroller 50. In a preferred embodiment, a function of the conditioning circuit 40 is to amplify the DV voltage value received from the touch-sensor circuit 30 and in so doing emphasize the voltage drop that occurs when a person touches or comes into proximity with the touch sensor 32.

Figure 5:
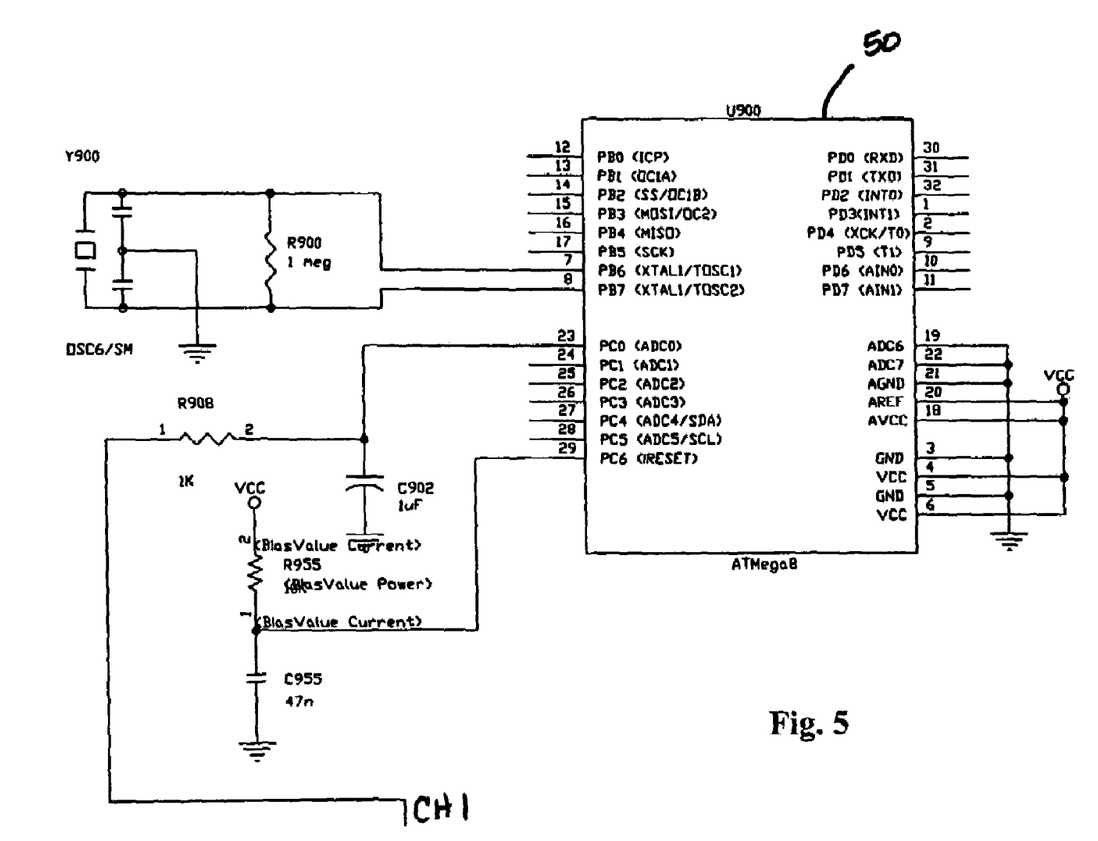
FIG. 5 is a diagram of a microcontroller circuit in accordance with an embodiment of the present invention.

FIG. 5 is a diagram for a conventional microcontroller 50 circuit in accordance with an embodiment of the present invention. The line marked with CH1 represents the output from the conditioning circuit 40 and carries the amplified DC voltage to the microcontroller 50. In a preferred embodiment the amplified DC voltage is the signal used in the processes described below to differentiate between a human-intended activation and noise induced upon the system. As one of ordinary skill in the art will recognize, when the signal is passed through the conditioning circuit 50 any noise that is on the line is amplified along with the signal. The processes described below provide a novel method of detecting a human-intended activation in the presence of the noise that can accompany the amplified signal.

Figure 6:
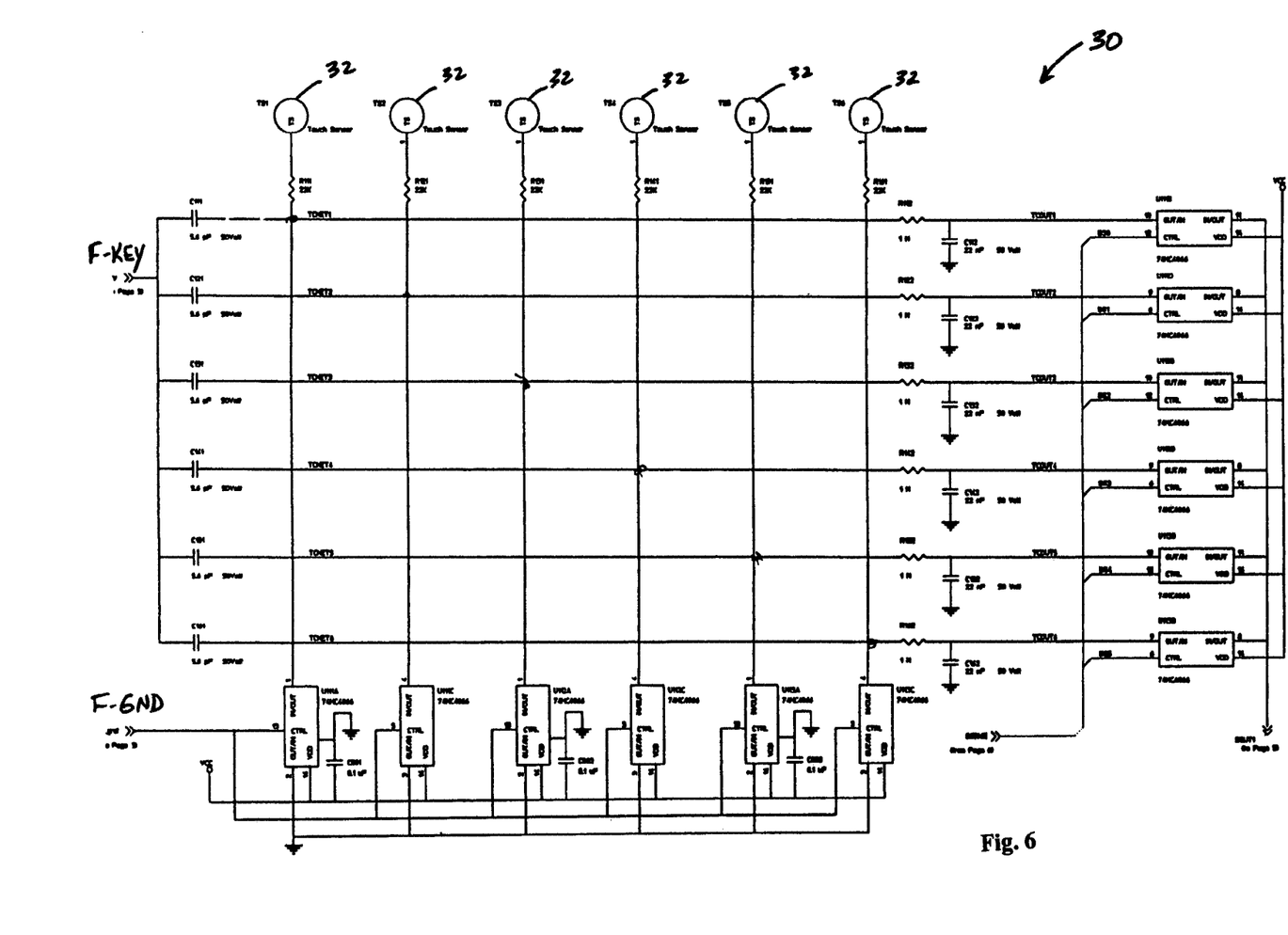
FIG. 6 is a diagram of a touch capacitance control circuit in accordance with a second embodiment of the present invention.

The foregoing figures and descriptions describe an exemplary touch capacitance control circuit 10. One of ordinary skill in the art will readily recognize that other control systems and methods of touch detection are known in the art and can be used with the present invention. In addition, one of ordinary skill will recognize that the present invention can be used in circuits that include a plurality of touch sensors 32. Using techniques that are well known in the art, the signals from multiple touch sensors 32 can be multiplexed into a single line. The circuit in FIG. 6 is one example of a circuit with a plurality of touch sensors 32 that can be used with the present invention. With reference to FIG. 6, the signals from six touch sensors are multiplexed into a single line with each of the touch sensors 32 being associated with a unique time interval and voltage level. The multiplexed signal is passed through the conditioning circuit 40 to the microcontroller 50 where the signal is demultiplexed and decoded, using known processes, to isolate the signal associated with each of the six touch sensors 32. Each of the signals are then analyzed using the processes described below to determine whether a human-intended activation has occurred.

The following paragraphs describe a novel process through which the signal from a touch sensor circuit is analyzed to differentiate between a human-intended activation and noise induced upon the system. In a preferred embodiment, this differentiation is made possible by recognizing that the output signals of the touch sensors 32 exhibit characteristics that are unique to human or human-like contact or proximity when compared to the output signal that results from noise in the system. Specifically, the sum of the cumulative deviation either in an upward or downward trend of the direction of the change in the signal compared to the maximum reading of the signal is larger for human or human-like contact or proximity than for induced noise. In addition, the same trend is exhibited when applied in comparison to the scale of the signal readings. And a significant differentiation is noted even when applied in comparison to the average reading of the signal.

Figure 7:
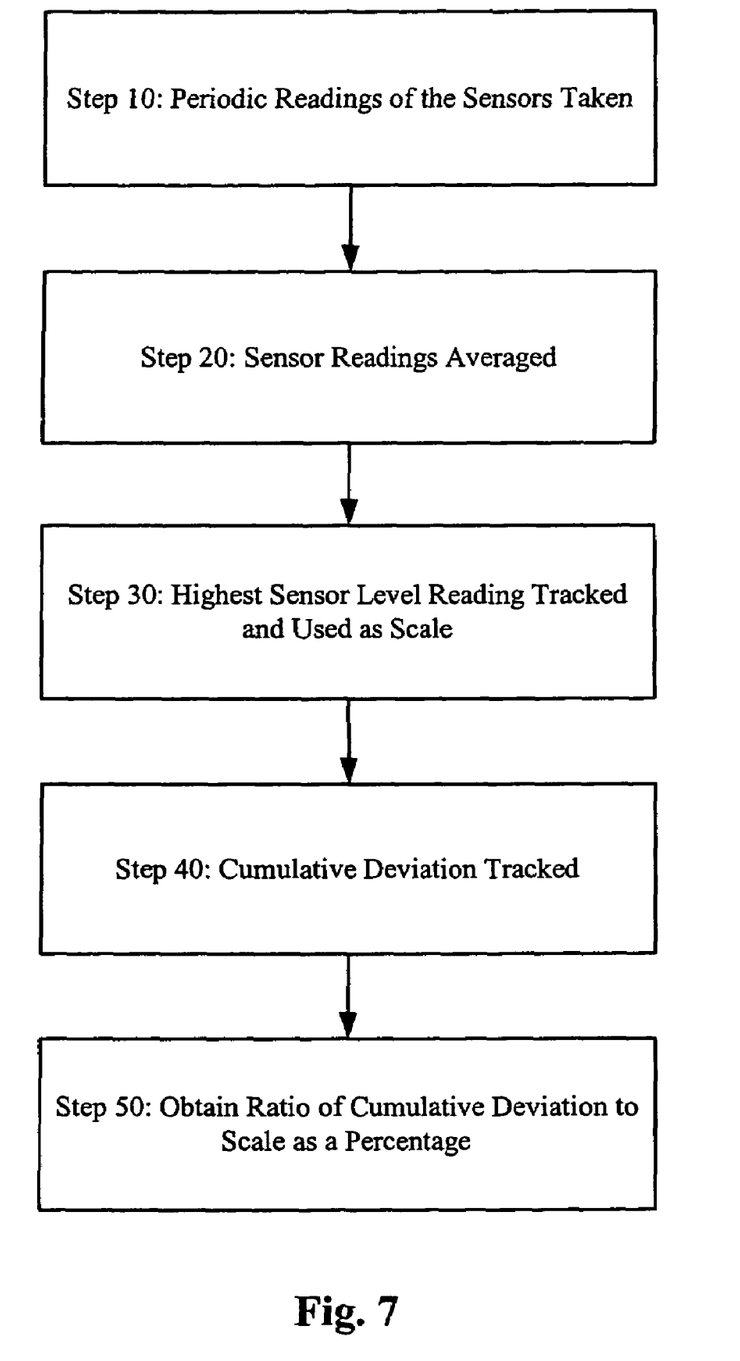
FIG. 7 is a process flow diagram of the steps required to analyze a signal to differentiate between a human-intended activation and noise induced on a system in accordance with an embodiment of the present invention.

FIG. 7 illustrates a process flow diagram that illustrates how the above-described touch sensor 32 characteristics can be used to differentiate between noise and human or human-like contact or proximity in accordance with an embodiment of the present invention. In Step 10, periodic readings are made of the DC voltage level from the touch sensor circuit. In Step 20, the sensor readings are averaged using the following formula:

$$\text{Average} = (\text{Reading}(1) + \ldots + \text{Reading}(n))/n$$

In a preferred embodiment, a running average is taken from a predetermined number of readings. In one embodiment, the running average is taken from the four most recent readings. But one of ordinary skill in the art will recognize that different numbers of readings can be used with the present invention. The act of averaging multiple sensor readings taken over a period of time provides an initial degree of noise reduction and, in noisy systems, larger sample sizes can provide more accurate noise filtration.

In Step 30, the highest sensor level reading is tracked and provides a scale that will be used in the following calculations. The following formula denotes the calculation performed at Step 30:

$$\text{Maximum} = \text{MAX}(\text{Average}, \text{Maximum})$$

In one embodiment, the maximum value is a rolling maximum and is set to the highest reading detected during a predetermined interval. Thus, maximum is assigned an initial maximum, which may be for example the value of the highest possible sensor voltage, and this initial value is replaced with the highest reading detected during a predetermined interval, such as one minute. In this example, each successive minute the maximum value will be changed to reflect the highest sensor reading detected during the last interval. In an alternative embodiment, the maximum value is set to the highest possible sensor voltage for the system and this value does not change.

In Step 40, the cumulative deviation is tracked whenever there is an upward or downward trend in the sensor signals, as follows:

$$\text{CumDeviation} = \text{CumDeviation} + \text{Deviation}$$

As one of ordinary skill in the art will readily recognize, the deviation in this formula is the difference between the sensor signal reading and the average reading, and the cumulative deviation is the sum of the deviations for those sensor readings in the trend. A trend, as that term is used herein, refers to a tendency in vector readings in an upward or downward direction. The term vector, as used herein, is a quantity having a magnitude and direction that signifies the degree of change and the direction of change between consecutive sensor readings.

In Step 50, the ratio of the cumulative deviation to scale is obtained as a percentage. The following formula represents the calculation performed at Step 50:

$$\text{Ratio} = (\text{CumDeviation} * 100)/\text{Maximum}$$

The presence of a human-intended activation, a touch if the trend is in an upward direction or a release in the case of a downward trend, is determined by examining first whether the ratio calculated above has met or exceeded a target ratio and second whether the target ratio was met or exceeded within an appropriate number of vectors. In a preferred embodiment, a human-activation is noted if the percentage calculated above reaches or exceeds a target of 50% within the course of between two and eight vectors that are detected in the same direction (either upward or downward). Thus, in this embodiment, if the target percentage is reached in a single vector (between two consecutive sensor readings) then the system interprets this change as a noise spike and not as a touch. Similarly, if the target percentage is reached over a period of nine or more vectors, the system again attributes the change to noise. In contrast, if the target percentage is reached over a period of between two and eight vectors, then the system interprets this as a human-intended activation and sends the appropriate output control signal.

In a preferred embodiment, the trend in the vectors must be in a single direction, up or down, and at the same time must achieve the desired degree of attenuation to be considered a touch. Thus, in this example, a "fast touch" is one in which the target percentage is achieved or exceeded over the course of two vectors, whereas a "slow touch" is one in which the target percentage is achieved over eight vectors. One of ordinary skill in the art will recognize that the number of vectors used to determine a touch can vary from system to system and upon the touch thresholds of the user. For example, a first manufacturer may require that the slowest acceptable touch meet or exceed the target percentage within eight vectors whereas a second manufacturer may accept as a human-intended activation a touch that spans ten, twelve or more vectors.

The number of vectors require to reliably detect a touch is also affected by the frequency of the sensor readings, that is, the length of time between successive readings. In the above-described embodiment in which two to eight vectors are used to determine a touch, the length of time between readings is approximately sixteen milliseconds. But in systems in which touch sensor readings are received every four to six milliseconds, for example, a typical touch will span a greater number of vectors. Similarly, in systems, in which the microcontroller receives the touch sensor voltage values at a lower frequency, a human-intended activation will span fewer vectors.

Figure 8:
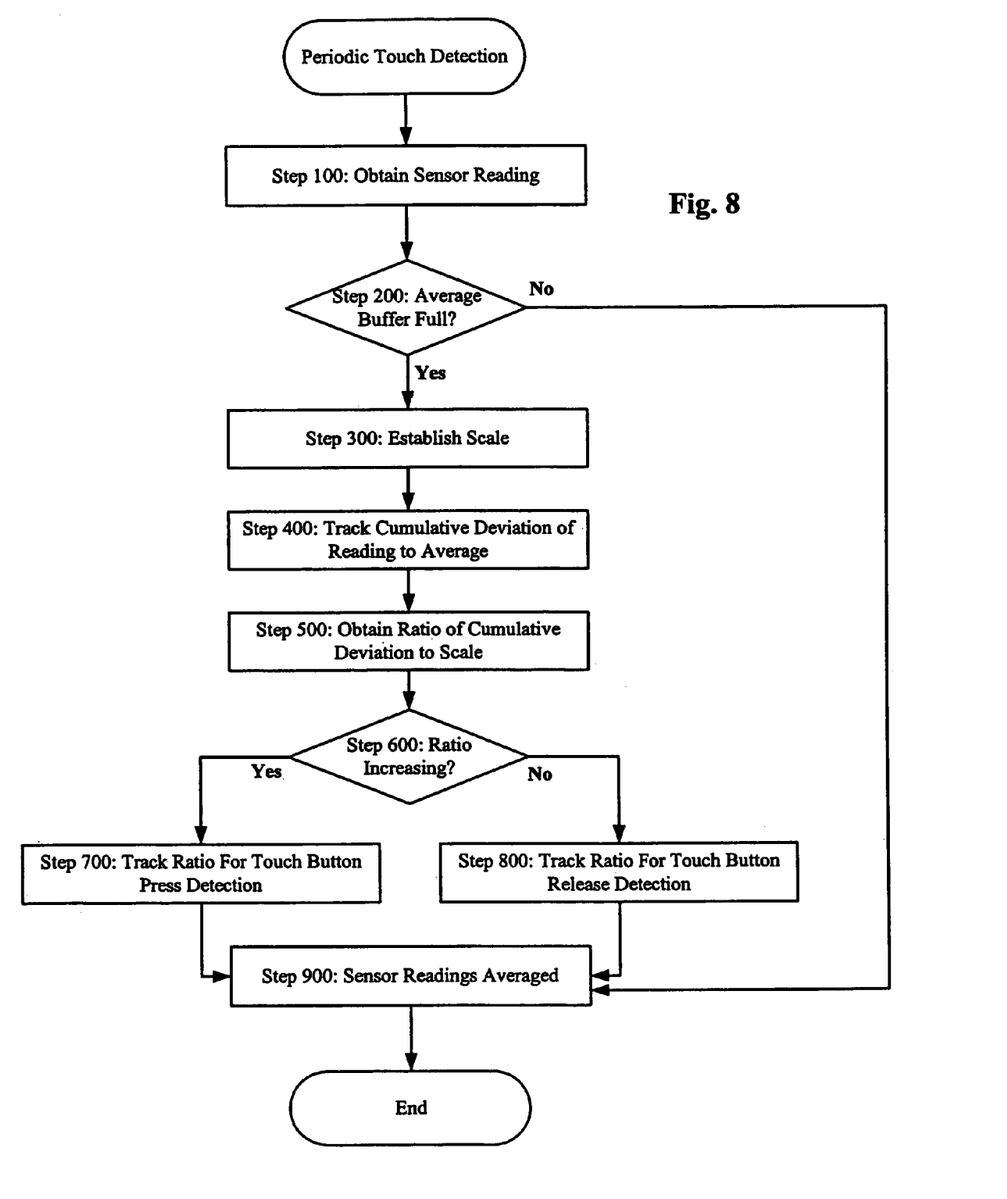
FIG. 8 is another process flow diagram of a touch sensor signal analysis process in accordance with an embodiment of the present invention.

FIG. 8 is another flow chart that illustrates the steps used to analyze a sensor reading to detect an intended activation in accordance with an embodiment of the present invention. This process parallels that shown in FIG. 7 but also includes some of the decision trees that may be included in the analysis.

In Step 100, a sensor reading is received. In a preferred embodiment, sensor readings are received in a predetermined frequency and, if multiple sensors are involved, the reading for a particular sensor may be multiplexed with signals from other touch sensors. In Step 200, a counter is checked to determine whether sufficient readings have been received to determine an average sensor value. In a preferred embodiment, the average used in the following calculations is a running average that spans, for example, the past four readings. Thus, as the first four sensor readings are received, they are buffered and the process proceeds directly to Step 900 where the average sensor reading is calculated. The process does not proceed to Step 300 until the buffer is full, which in this example, occurs upon receipt of the fifth sensor reading. Once the average sensor buffer is full, as additional touch sensor readings are received, the most recent readings are added to the buffer while the oldest readings are dropped. Thus, when the fifth sensor reading is received, the average reading is the average of the first through fourth sensor readings. When the sixth sensor reading is received, the average reading is the average of the second through fifth sensor readings. In this way, a running average of the most recent four sensor readings is maintained.

In Step 300, the scale is set to an appropriate level. As described above, the scale value may be set to the highest possible sensor level reading or, in an alternative embodiment, the scale may be a rolling scale and set to the highest sensor reading received over a period of time. In Step 400, the deviation of the most recently received sensor reading from the average sensor reading is calculated and this value is added to a running cumulative deviation total. In Step 500, a ratio of the cumulative deviation total to the scale is made and the ratio is converted to a percentage.

In Step 600, the percentage calculated in Step 500 is compared against the last ratio percentage to determine whether the ratio is increasing. If the ratio is trending upward (i.e. the ratio is increasing) then the process proceeds to Step 700. But if the ratio is decreasing or has not changed from the last reading, the process proceeds to Step 800.

In a preferred embodiment, the processes of Step 700 and 800 are nearly identical. When an increasing ratio is detected, Step 700 is performed to determine whether a touch sensor has been pressed. Whereas when a ratio that is moving in a downward direction is detected, Step 800 is performed to determine whether a touch sensor has been released. In a preferred embodiment, the determination of an intended activation is made by comparing the ratio to a threshold and examining the number of readings that were required to meet or exceed the threshold. Thus, for example, a target threshold (expressed as a percentage) for a particular touch sensor, dielectric and circuit configuration might be 50% and the microcontroller configured to detect an intended activation (or deactivation) if the target threshold is met or exceeded within the span of two to eight sensor readings.

In such a configuration, if the target threshold is exceeded in the span of a single reading, the microcontroller recognizes the sudden increase as a noise spike and either ignores the reading or takes whatever action is appropriate when there is noise on the system. Similarly, if the ratio trends steadily upward but does not meet or exceed the threshold after eight readings (or whatever maximum number of readings is deemed acceptable for a slow touch), then the microcontroller again attributes the rise to system noise and responds appropriately. In contrast, if in Steps 700 and 800 the system determines that the threshold ratio is met or exceeded and that the threshold was exceeded within a predefined range of sensor readings, the microcontroller attributes the increase (or decrease) as an intended activation (or deactivation) and sends an output signal indicative of a press (or release).

A benefit of the foregoing sensor signal analysis is a significant noise immunity benefit. In addition, this process consolidates the sensor signal readings into common levels and thereby allows for the use of analog type controls to replace potentiometers and encoders.

Another benefit of the approach to human activation and noise differentiation embodied by the present invention is the ability to operate the system in the presence of noise and to eliminate the delays inherent in the signal processing techniques known in the art. The present invention provides an enhanced ability to differentiate between a signal and noise and provides for increase reliability of the control. When combined with well-known delaying and masking signal processing techniques the systems and methods of the present invention offer greater reliability and functionality to the control than is presently known in the art. Examples of this include but are not limited to the ability to customize an imposed delay to give an extremely fast, or even instantaneous response on some inputs; the ability to intelligently and selectively mask out certain combinations of simultaneous inputs while allowing other forms of simultaneous input; and the ability to alter some or all of these features based on the current state of the control with respect to the user's operation without introducing safety issues.

Still another benefit of the present invention is to provide a method of noise immunity which selectively determines between a touch like pattern and noise even in a noisy environment. This method not only allows for the operation of the cook top in the presence of noise but also removes all constraints on the responsiveness of the buttons outside the time it takes to recognize that a touch has occurred as well as making simultaneous touch detection a safety feature that can be applied intelligently depending on the operating state. This allows for greater flexibility in the design of the operation of the touch sensors 32 as well as improving the quality and the reliability of the touch sensors 32.

Still another aspect of the present invention is the use of multiple touch sensors 32 in a set or array to perform inputs typically performed by potentiometers or encoders. This encompasses reliable 'slider' type controls (or touch bar controls), which utilize multiple simultaneous sensor detections to perform such tasks as previously performed using potentiometers or encoders. In a preferred embodiment, a series of sensors are disposed in circular, linear, curvi-linear or even abstract patterns and are configured to detect the direction and speed of human or human-like contact or proximity. According to one aspect of the invention, touch sensors 32 are disposed on opposite sides of glass and will detect when the glass is touched.

The present invention thus allows for the replacement of a linear potentiometer with a linear array of sensors that are configured to allow the user to slide across the array and/or pick specific points on or about the array. The ability to replace potentiometer and encoders with touch sensors 32 results from the improved resolution of the systems and methods of the present invention and the resulting ability to recognize and include more input locations than sensors. The ability to replace potentiometers with an array of sensors results from the improved ability to differentiate between a signal and noise. Further, the enhanced noise differentiation techniques of the present invention allow the control system to accurately detect input in areas (i.e. in-between sensors) that previously could not have been consistently detected due to the limitations on known noise differentiation techniques.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. A method of differentiating between an intended activation of a touch sensor and noise in a circuit, said method comprising the steps of:
   receiving a touch sensor reading;
   calculating an amount of deviation between said touch sensor reading and an average sensor reading;
   adding said amount of deviation to a cumulative deviation tally;
   obtaining a ratio of said cumulative deviation tally to a scale;
   incrementing a counter that tracks the number of touch sensor readings included in said cumulative deviation tally; and
   sending an output signal indicative of a touch if said ratio meets or exceeds a threshold and said counter falls within a predetermined range.

2. The method of claim 1, wherein said average sensor reading is an average of a predetermined number of previous touch sensor readings.

3. The method of claim 1, wherein said average sensor reading is an average of four previous touch sensor readings.

4. The method of claim 3, further comprising the step of updating said average sensor reading to include said touch sensor reading as one of said four previous readings used to calculate said average.

5. The method of claim 4, wherein further including the step of expressing said ratio as a percentage and comparing said percentage against said threshold.

6. The method of claim 1, further comprising:
   comparing said ratio against at least one stored ratio to determine whether said ratio is continuing a trend of increasing or decreasing; and
   resetting said cumulative deviation tally and said counter if said ratio is not continuing said trend established by said at least one stored ratio.

7. The method of claim 1, further comprising ignoring said touch sensor reading if said ratio exceeds said threshold and said counter is one.

8. The method of claim 1, further comprising ignoring said touch sensor reading if said ratio exceeds said threshold and said counter is greater than eight.

9. The method of claim 1, further comprising ignoring said touch sensor reading if said ratio exceeds said threshold and said counter is less than two or greater than eight.

10. The method of claim 9, further comprising resetting said cumulative deviation tally and said counter if said counter is less than two or greater than eight.

11. The method of claim 1, wherein said threshold is determined at least in part by a configuration of said circuit, said touch sensor and a dielectric cover.

12. The method of claim 1, wherein said predetermined range comprises between two and eight touch sensor readings.

13. The method of claim 1, wherein said predetermined range comprises between two and twelve touch sensor readings.

14. A method of differentiating between an intended activation of a touch sensor and noise in a circuit, said method comprising the steps of:
   receiving a touch sensor reading;
   calculating an amount of deviation between said touch sensor reading and an average sensor reading;
   adding said amount of deviation to a cumulative deviation tally;
   obtaining a ratio of said cumulative deviation tally to a scale;

comparing said ratio against a stored ratio to determine whether said ratio is increasing;

performing the following steps if said ratio is increasing:
1. incrementing a counter that tracks the number of touch sensor readings included in said cumulative deviation tally; and
2. sending an output signal indicative of a pressed touch sensor if said ratio meets or exceeds a threshold and said counter falls within a predetermined range; and performing the following steps if said ratio is not increasing:
1. incrementing a counter that tracks the number of touch sensor readings included in said cumulative deviation tally; and
2. sending an output signal indicative of a released touch sensor if said ratio meets or exceeds a threshold and said counter falls within a predetermined range.

15. The method of claim 14, wherein said predetermined range comprises a high and a low value and said method further comprises the step of resetting said counter and said cumulative deviation tally if said threshold is met or exceeded and said counter is less than said low value.

16. The method of claim 14, wherein said predetermined range comprises a high and a low value and said method further comprises the step of resetting said counter and said cumulative deviation tally if said counter reaches said high value without said ratio meeting or exceeding said threshold.

17. The method of claim 14, wherein said predetermined range is between two and eight.

18. The method of claim 14, wherein said predetermined range is between two and twelve.

19. The method of claim 14, wherein said threshold is 0.50.

20. The method of claim 14, further comprising converting said ratio to a percentage.

21. The method of claim 14, wherein said scale is set at a highest potential touch sensor reading.

22. The method of claim 14, wherein said scale is set at a highest detected sensor reading over a period of time.

23. The method of claim 22, wherein said period of time is one minute.

24. A method of analyzing readings from a touch sensor to differentiate between noise and a presence of a human-intended activation of said touch sensor, said method comprising the steps of:
receiving a first group of sensor readings;
calculating an average reading of said first group;
receiving a second group of sensor readings;
calculating a deviation from said average reading of the first group for each sensor reading in said second group;
calculating a cumulative deviation for said second group;
obtaining a ratio of said cumulative deviation to a maximum value; and
indicating that said human-intended activation has occurred if:
said ratio meets or exceeds a threshold value; and
said threshold is met or exceeded within a predetermined number of sensor readings.

25. The method of claim 24, wherein the step of receiving a first group of sensor readings comprises receiving at least four sensor readings.

26. The method of claim 24, wherein said maximum value is the highest sensor reading detected over a period of time.

27. The method of claim 24, wherein said maximum value is the highest possible sensor reading.

28. The method of claim 24, wherein said sensor readings are measured in volts.

29. The method of claim 24, wherein said sensor readings are received at a frequency of approximately one every sixteen milliseconds.

30. A method of differentiating between an intended activation of a touch sensor and noise in a circuit, said method comprising the steps of:
receiving a signal that includes a plurality of touch sensor readings that are multiplexed into said signal;
demultiplexing said signal to isolate a single touch sensor reading;
calculating an amount of deviation between said single touch sensor reading and an average sensor reading;
adding said amount of deviation to a cumulative deviation tally;
obtaining a ratio of said cumulative deviation tally to a scale;
incrementing a counter that tracks the number of touch sensor readings included in said cumulative deviation tally; and
sending an output signal indicative of a touch if said ratio meets or exceeds a threshold and said counter falls within a predetermined range.

31. The method of claim 30, wherein each of said multiplexed touch sensor readings is associated with a unique time interval and voltage.

32. The method of claim 30, further comprising decoding said demultiplexed signal.

33. A capacitive responsive circuit for detecting a proximity or touch of a person in a noisy environment and for controlling power to a load, said circuit comprising:
an oscillator that provides a periodic output signal;
a touch circuit coupled to said oscillator to receive said periodic output signal, said touch circuit including a touch sensor for receiving tactile command information from an operator, said touch circuit further comprising a low pass filter for converting a frequency of said periodic output signal to a DC voltage value; and
a detector circuit coupled to said touch circuit, said detector circuit including a microcontroller that receives a plurality of said DC voltage values over time and generates an output signal in response to an intended activation of said touch sensor, said microcontroller configured to monitor said plurality of DC voltage values and to detect an intended activation of said touch sensor based at least in part on a comparison of a ratio of a cumulative deviation of said plurality of DC voltage values from an average voltage value to a scale against a threshold ratio.

34. A capacitive responsive circuit for detecting a proximity or touch of a person in a noisy environment and for controlling power to a load, said circuit comprising:
an oscillator that provides a periodic output signal;
a touch circuit coupled to said oscillator to receive said periodic output signal, said touch circuit including a plurality of touch sensors that receive tactile command information from an operator, said touch circuit further comprising a low pass filter associated with each of said plurality of touch sensors for converting a frequency of said periodic output signal to a DC voltage value; and
a detector circuit coupled to said touch circuit, said detector circuit including a microcontroller that receives a plurality of said DC voltage values over time and generates an output signal in response to an intended activation of said touch sensor, said microcontroller configured to monitor said plurality of DC voltage values and to detect an intended activation of said touch sensor based at least in part on a comparison of a ratio of a cumulative deviation of said plurality of DC voltage values from an average voltage value to a scale against a threshold ratio.

35. The circuit of claim 34, wherein said plurality of touch sensors are arranged as an array.

36. The circuit of claim 35, wherein said plurality of touch sensors are configured to detect a direction and speed of a human or human-like contact.

* * * * *